United States Patent Office 3,841,953
Patented Oct. 15, 1974

3,841,953
NONWOVEN MATS OF THERMOPLASTIC
BLENDS BY MELT BLOWING
Dwight Theodore Lohkamp, Baytown, Tex., and James S. Prentice, Shorewood, Ill., assignors to Esso Research and Engineering Company
Filed Mar. 3, 1972, Ser. No. 231,521
Int. Cl. D04h 3/14
U.S. Cl. 161—150                    7 Claims

ABSTRACT OF THE DISCLOSURE

Nonwoven mats of superfine fibers, wherein each fiber comprises a blend of thermoplastic resins, are continuously made in a melt-blowing process. In the preferred embodiment, the resins within each fiber are generally dissimilar in properties, and the fibers have diameters from 0.5 to 50 microns which are self bonded to a greater or lesser extent. Physical properties of the mats can be varied as desired over a wide range by selecting the proper combination and quantities of each resin in the blend. At least one of said resins is a fiber-former.

CROSS-REFERENCES TO RELATED APPLICATIONS

This is an improvement over processes described in earlier copending commonly assigned applications Ser. Nos. 103,050 and 103,094 each filed Dec. 31, 1970 both abandoned, and U.S. Pats. Nos. 3,650,866; 3,704,198; 3,715,251; 3,755,527.

BACKGROUND OF THE INVENTION

1. Field of the Invention

The present invention is directed to nonwoven mats having unique properties prepared by melt-blowing a blend of thermoplastic resins. More particularly, the present invention relates to the melt-blowing of a blend of thermoplastic resins which can be preblended or premixed prior to introduction into the melt-blowing die and the novel and unusual nonwoven mats made by the process.

2. Prior Art

A melt-blowing process is disclosed in the article "Superfine Thermoplastics," by Van A. Wente, in *Industrial and Engineering Chemistry*, 48, No. 8 (1956), pages 1342–1346. In the melt-blowing process disclosed in the Wente article, synthetic resins such as nylon, polystyrene, polymethylmethacrylate and polyethylene are illustrated. However, no blends are disclosed.

U.S. 3,532,800 discloses the Wente melt-blowing process and also discloses that fibers of different resins can be physically mixed. But it does not disclose individual fibers made up of blends of resins.

A melt-spinning and blowing process is disclosed in British Pats. 1,055,187 and 1,215,537.

BRIEF SUMMARY OF THE INVENTION

Blends of two or more thermoplastic resins in a single feed to a melt-blowing die are used, resulting in nonwoven mats of unusual and novel physical characteristics.

DETAILED DESCRIPTION OF THE INVENTION

Figure 1:
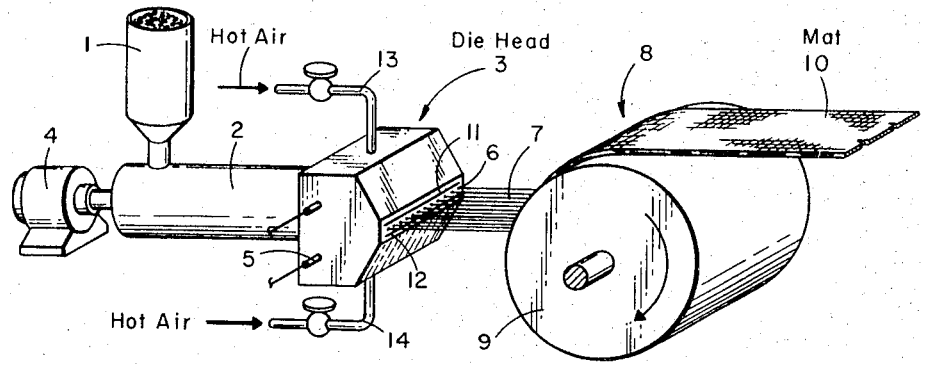
FIG. 1 is a schematic view of the overall melt-blowing process.

As a matter of necessity heretofore, only one thermoplastic resin has been used in any fiber-forming process at one time. In those instances where more than one thermoplastic resin has been employed, it has required entirely separate handling of each thermoplastic resin. There is a very cogent and well-recognized reason for this state-of-the-art attitude. It can be easily understood when it is remembered that most conventional melt-spinning processes are intended to develop fairly long, continuous fibers. When blends were attempted, it was found that the dissimilarities between the polymers caused weak spots to develop in the fiber. Consequently severe fiber breakage would result.

Thus, it became strongly established conventional wisdom in the fiber industry that blending resins together to make fibers was a completely unacceptable practice.

It has now been realized for the first time and forms the conceptional substance of this invention that in a melt-blown process, fiber blends can be used because the fibers are so short anyway that breakdown at weak spots is not a controlling aspect.

The benefits and advantages of mats comprised of fibers made up of blends of at least two different fibers are profound. A wide variety of combinations is possible to produce mats having an endless number of special properties; usually depending on a particular use requirement.

There are some basic principles which have been discovered and should be followed to achieve the best results.

At least one of the resins in the blend must be an accepted fiber-former. When it is blended with a nonfiber-forming material, generally not more than 10 weight percent, preferably less than 5 weight percent of the latter based on the total blend should be used.

Otherwise the resins or other material can be blended in the ranges of 0.5 to 99.5, preferably 2 to 80 and most preferably 40 to 60 weight percent.

The resins can be previously melt-blended together, but that is not necessary. Crude physical blending of the resins, i.e. mixing up pellets of two different resins can be introduced into the extruder portion of the melt-blown sequence.

When the blend is in its liquefied, low viscosity state, just as it is contacted by the gas of the melt-blown process, there is usually good mixing of the component polymers.

When the fibers solidify, a wide range of physical relationships of the constituent polymers within each individual fiber will exist. This will be dependent on the polymer types in the blend as well as the particular ambient environment of a given fiber, during formation and subsequent cooling.

Although most blends will be with polymers alone, it is also possible to blend one or more non-polymeric components with a fiber-forming polymer in amounts not exceeding 5 weight percent of the former, and usually not more than 1 weight percent of the former.

A good example of this is the incorporation of dyes into the fiber-forming material in order to obtain colored mats made up of dyed fibers. Other additives could also be used such as surfactants, plasticizers, stabilizers and the like.

Coloring of the nonwoven material obtained by flowing polymer through small orifices presents difficulties with the usual pigments used in coloring plastics. At the high spin temperature of 500° to 700° F. the viscosity is low and pigment settles out, agglomerates, and plugs screens and passages.

Heat stable dyes, with low melting points, good stability and fastness properties have been used to obtain coloration with no processing difficulties. The dyes give transparent colors where pigmentation results in opaque colors that are not always desirable.

Some commercial dyes such as

Latyl Blue 46 FS
Latyl Blue BCN
Du Pont Milling Blue BL
Latyl Yellow GFS have good colored melt blown nonwoven materials with 0.25% dye added to the polymer pellets prior to melt blowing into fiber. These dyes in concentrations to 0.5% by weight can be applied easily by heating the polymer pellets to 100 to 250° F. and tumbling with a small amount of a silicone fluid for 10 minutes. The fine ground pure dye without filler is then added and tumbled to obtain occlusion and penetration into the pellet.

The dye-containing polypropylene pellets are spun to a nonwoven fiber by heating to temperatures as high as 700° F. and blown with air through a spinning head to obtain an interlaced, nonwoven mat that is collected on a revolving screen drum and wound onto a roll.

The colors have good value with no evidence of deterioration during spinning.

One aspect of the present invention may be briefly described as a nonwoven mat of fibers comprised of a blend of two or more thermoplastic resins wherein the fibers within the mat have a two directional randomness and the fiber size may be between about 0.5 and 5 microns. In most instances, the fibers are produced from a well mixed blend of the two or more thermoplastic resins, and thus appear as a mixed blend of resins across essentially the entire cross section of the fiber formed in the melt-blowing process.

The present invention may more fully be described as a melt-blowing process for producing nonwoven mats of fibers consisting of a blend of two or more thermoplastic resins. The process comprises blending two or more thermoplastic resins, preferably as a salt and pepper blend of pellets into the hopper of an extruder wherein the thermoplastic resins are thermally treated, if necessary. The thermally treated thermoplastic resin blend is then extruded through a plurality of die openings into a heated gas stream, preferably air, to attenuate the thermoplastic blend of resins into fibers.

The gas stream is produced by jets which are adjacent to and on either side of the die opening. The attenuated fibers are collected on a moving take-up device which is from one to thirty inches from the die opening. The fibers in the nonwoven mat can be self bonded ranging from a highly bonded mat to one having little self bonding. Highly bonded nonwoven mats are used in a number of applications without the requirement of further treatment, compacting or shaping.

A PREFERRED EMBODIMENT

Referring to FIG. 1 of the drawings, a 50/50 salt and pepper blend of nylon and polypropylene thermoplastic resin pellets is introduced into a pellet hopper 1 of an extruder 2. The thermoplastic blend is thermally treated in the extruder 2 and/or die head 3. The thermal treatment of the thermoplastic blend is carried out in the extruder 2 at temperatures in excess of 500° F., and preferably within in the range of 575° F. to 750° F.

The degree of thermal treatment necessary varies depending upon the specific thermoplastic resins used in the blend as well as the molecular weight of the thermoplastic resins in the blend or the amount of thermal treatment which has been carried out on the thermoplastic resins prior to being introduced as pellets into the extruder 2. It has been found, for example, that all conventional polypropylene and other polyolefins require substantial thermal treatment before they can be utilized in the melt-blowing process of the present invention.

The thermoplastic blend is forced through the extruder 2 by a drive 4 into the die head 3. The die head 3 may contain a heating plate 5 which may also be used in the thermal treatment of the thermoplastic resins before the blend is melt-blown. The thermoplastic resin blend is then forced out a row of die openings 6 in the die head 3 into a gas stream which attenuates the resins into continuous fibers 7 which are collected on a moving collection device 8 such as a drum 9 to form a continuous nonwoven mat 10. The gas stream which attenuates the thermoplastic resin blend is supplied through a gas jet 11 and 12, respectively. These gas jets or slots 11 and 12 are supplied with a hot gas, preferably air, by gas lines 13 and 14, respectively.

Figure 2:
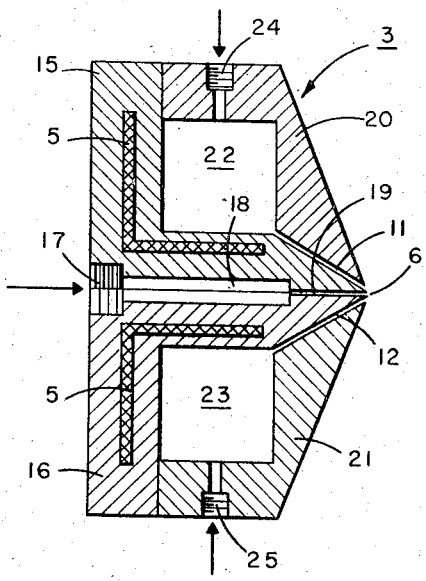
FIG. 2 is a cross sectional view of a die used in the melt-blowing process.

The melt-blowing process is further understood by considering the cross section of a die head 3 which may be used in the process as set forth in FIG. 2. The die head 3 may be made up of upper die plate 15 and a lower die plate 16. The blend of thermoplastic resins may be thoroughly mixed in the extruder 2 and may be introduced into the back of the die plates 15 and 16 through a single inlet 17. The blend of resins then pass into a chamber 18 between the upper and lower die plates 15 and 16, respectively. In one possible die design for the melt-blowing process, the facing of the die plate 16 may be milled to have grooves 19 which terminate in die openings 6. It is understood, of course, that the milled grooves may be in the lower die plate 16, in the upper die plate 15, or the grooves may be milled in both plates 15 and 16. An upper gas cover plate 20 and a lower gas cover plate 21 are connected to the upper die plate and lower die plate 15 and 16, respectively.

The hot gas is supplied through the inlet 22 in the upper gas plate 20 and the inlet 23 in the lower gas plate 21. Suitable baffling means (not shown) may be provided in both the upper air chamber 24 and the lower air chamber 25 to provide a uniform flow of air through the gas slots 11 and 12, respectively. As shown in FIG. 1, the blend of thermoplastic resins is attenuated by the air as attenuated fibers 7, each of which is comprised of the thermoplastic blend, and which are collected on a collecting device such as the drum 9 which may be positioned from one to thirty inches from the die openings 6 in the die head 3.

The nonwoven mats produced when the fibers are collected at a distance of one and one-quarter to two inches differ in compactness and appearance from those produced at a distance of five to eight inches, or those collected at a distance greater than twelve inches. The primary difference is in the degree of self bonding which occurs in the nonwoven mat. When the collecting distance is very small, a compact and highly self bonded nonwoven mat is produced. On the other hand, when the collecting distance is greater than twelve inches, a soft web or mat is produced which has greater tear resistance even though it may not have quite the tensile strength of mats collected at shorter distances.

In making a uniform mat or web, it is desired to eliminate the formation of "shot" and/or "rope." "Shot" is a mass or glob of thermoplastic resin with a diameter many times the average diameter of the fiber in the mat, and appears to be the result of individual fibers breaking. "Rope" occurs when the air rates are out of adjustment such that the attenuated fibers come into contact one with the other and are not blown away from the die head as individual fibers, but come into contact and are laid down as collected aggregates of fibers. Insufficient air pressure, or having either the upper or lower gas slots out of control will produce "rope" in a nonwoven mat. "Rope" can also be formed at long die head to collecting device distances (two to three feet) where the fibers are entangled due to the turbulence of the air jets. As the gas flow rates are increased sufficiently so that "rope" is not formed, mats are formed having essentially no "shot" or "rope." With increasing gas flow rates, the amount of "shot" generally increases. As the gas flow rates increase even further, the "shot" becomes smaller and often elongated, and appears as very fine "shot" at high gas flow rates. "Shot" is unacceptable when the masses or globs of thermoplastic resin are relatively large (greater than 0.1 millimeters in diameter) and can be seen with the eye, or when the web is calendered as an imperfection or fused spot.

In the melt-blowing process of a blend of two or more thermoplastic resins according to the present invention, the die temperature is maintained above about 500° F. The preferred die temperatures may range between 575°–750° F. The appropriate thermal treatment to be given to the blend of thermoplastic resins in the extruder 2 that feeds the melt-blowing die head 3 may be determined as follows. A die temperature is selected from the preferred range and a polymer rate in terms of grams/minute/die opening is selected, and then an air rate is set at 25–50 pounds/minute/inch² of air slot. The nonwoven mat produced is observed as the heating zones of the extruder 2 are heated. At too low a temperature in the extruder 2, the nonwoven mat contains many large globs of polymer and/or coarse ropy material. As the temperature in the extruder is increased, the nonwoven mat becomes finer fibered, softer, and has less and smaller "shot." When the temperatures in the extruder 2 are too high, the nonwoven mat produced becomes extremely soft and fluffy, but the air blast from the die causes extreme fiber breakage, and many short fibers to be blown through the air away from the laydown zone. The breakage of fibers and their being blown away from the laydown zone also occurs when the die temperature is too high. Another indication that the thermal treatment is adequate is the polymer pressure in the die head 3. When the blend of thermoplastic resins is correctly thermally treated, the pressure in the die head 3 lies in a small range independent of the starting resin or the die temperature.

The polymer flow rates, or the rate at which polymer is forced through the die opening 6, is dependent upon the specific design of the die head 3 and extruder 2. However, suitable polymer flow rates are between about 0.07–0.5 or more grams/min./opening. The polymer flow rate may be controlled by the speed of the extruder 2.

The gas flow rates are limited by process parameters. However, suitable products have been obtained at air rates between 0.5 to 225 pounds/min./inch² of air slot. It has been found that there are essentially two air rate regimes, a low moderate and a high regime, to produce good quality, nonwoven mats according to the melt-blowing process of the present invention.

One of the advantages of the invention is that an expensive polymer can be diluted to a certain degree with an inexpensive polymer without detracting too much from the gross properties of the expensive polymer.

In general the fibers of the invention are very small, i.e. diameters of from 0.5 to 50, preferably 0.5 to 20, most preferably 0.5 to 10 microns in diameter.

The invention is further illustrated by the following examples. Unless otherwise indicated the procedure for preparing the mats of the Examples was generally that described above, but the specific details were those described expressly in each Example. The polyethylene used in the Examples was low density.

Example 1

Blends of 10%, 50% and 90% Firestone XN 314 Nylon 6 were melt-blown with Enjay CD 392 polypropylene resin. These blends were extruded from a four-inch melt-blowing die under the following specific conditions, as set forth in Table I hereinafter.

TABLE I

| Run | 46-1 | 46-3 | 46-4 | 46-5 |
|---|---|---|---|---|
| Percent polypropylene | 100 | 90 | 50 | 10 |
| Percent nylon 6 | | 10 | 50 | 90 |
| Extruder zone 1, °F | 595 | 595 | 595 | 595 |
| Extruder zone 2, °F | 620 | 620 | 620 | 620 |
| Die heaters, °F | 640 | 640 | 640 | 640 |
| Average air chamber, °F | 607 | 607 | 607 | 607 |
| Average die tip temp., °F | 585 | 585 | 585 | 585 |
| Screw, r.p.m | 4.5 | 4.5 | 4.5 | 4.5 |
| Die to collector dist., in | 6 | 6 | 6 | 6 |
| Polymer rate, gm./min | 8.1 | 8.9 | 9.3 | 12.5 |
| Air rate, lb./min | 3.17 | 3.17 | 3.17 | 3.36 |
| Air, lb./lb. polymer | 178 | 162 | 155 | 122 |
| Die pressure, p.s.i | 115 | 135 | 140 | 125 |
| Web appearance | Good | Good | Good | ¹ Fair |

¹ (Shot.)

No attempt was made during these runs to optimize blowing conditions for each blend. The blends did process well at the conditions used with the exception of 46-5 which had considerable shot.

Physical properties of the nonwoven webs or mats produced above are listed in Table II.

TABLE II

| Run | 46-1 | 46-3 | 46-4 | 46-5 |
|---|---|---|---|---|
| Percent polypropylene | 100 | 90 | 50 | 10 |
| Percent nylon 6 | | 10 | 50 | 90 |
| Average basis wt | 77 | 88 | 99 | 111 |
| MD zero span tensile, meters | 3,122 | 2,659 | 1,856 | 1,319 |
| CD zero span tensile, meters | 2,111 | 1,871 | 1,425 | 817 |
| Average zero span tensile, meters | 2,617 | 2,265 | 1,641 | 1,068 |
| Ratio, MD/CD zero span | .68 | .70 | .77 | .62 |
| MD tear factor, dm.² | 184 | 163 | 194 | 78 |
| CD tear factor, dm.² | 181 | 151 | 245 | 76 |

The resulting mats, which were slightly compressed, had much better tear strength than comparable mats from 100% polypropylene.

Example 2

Blends of 5% and 20% Polyethylene with Enjay CD 393 polypropylene resin were melt-blown. These blends were melt-blown at both high and low air rates. Table III sets forth the melt-blowing conditions using a four inch melt-blowing die.

TABLE III

| Run | 41-1 | 41-5 | 41-6 | 41-4 | 41-3 |
|---|---|---|---|---|---|
| Percent propylene | 100 | 95 | 100 | 95 | 80 |
| Percent polyethylene | 0 | 5 | 0 | 5 | 20 |
| Extruder zone 1, °F | 595 | 615 | 615 | 615 | 615 |
| Extruder zone 2, °F | 625 | 650 | 648 | 650 | 650 |
| Die heaters, °F | 640 | 680 | 680 | 680 | 680 |
| Average air chamber, °F | 524 | 574 | 547 | 543 | 541 |
| Average die tip temp., °F | 596 | 644 | 635 | 635 | 636 |
| Screw, r.p.m | 28 | 28 | 28 | 28 | 28 |
| Die to collector dist., in | 6 | 18 | 18 | 18 | 18 |
| Polymer rate, gm./min | 22 | 22.6 | 22 | 22.8 | 22.8 |
| Air rate, lb./min | 3.51 | 3.38 | .63 | .67 | .66 |
| Air, lb./lb. polymer | 72 | 68 | 13 | 13 | 13 |
| Die pressure, p.s.i | 28 | 115 | 125 | 125 | 200 |
| Average fiber size, microns | 5 | 5 | 20 | | 25 |
| Web appearance | Good | Good | Good | Good | Good |

Although optimum conditions were not established, these runs illustrate that continuous nonwoven webs can be made using polyethylene and polypropylene blends. Fine fiber webs could not be made with the 20% polyethylene blend but could be made at the 5% level. At the 20% polyethylene level, using fine fiber processing conditions, only short fibered, weak webs could be made. This type of behavior has been observed using 100% polyethylene and is not observed with polypropylene.

TABLE IV

| Run | 41-1 | 4-5 | 41-6 | 41-4 | 41-3 |
|---|---|---|---|---|---|
| Percent polypropylene | 100 | 95 | 100 | 95 | 80 |
| Percent polyethylene | 0 | 5 | 0 | 5 | 20 |
| Average basis wt | 73 | 111 | 126 | 133 | 106 |
| MD zero span tensile, meters | 2,015 | 1,344 | 1,006 | 963 | 962 |
| CD zero span tensile, meters | 1,550 | 835 | 736 | 623 | 733 |
| Average zero span tensile, meters | 1,783 | 1,090 | 871 | 793 | 848 |
| Ratio, MD/CD zero span | .77 | .62 | .73 | .65 | .76 |
| MD tear factor, dm.² | 72 | 77 | 56 | 50 | 450 |
| CD tear factor, dm.² | 91 | 77 | 48 | 35 | 333 |

Example 3

Pellet blends of 25%, 50% and 75% poly-4-methylpentene-1 (TPX) were melt blown with Enjay CD 392 polypropylene resin. These blends were extruded at the following conditions from a four-inch melt-blowing die at the following conditions, as set forth in Table V.

TABLE V

| Run | 13-1 | 13-2 | 13-3 | 13-4 | 13-5 |
|---|---|---|---|---|---|
| Percent polypropylene | 100 | 75 | 50 | 25 | 0 |
| Percent TPX | 0 | 25 | 50 | 75 | 100 |
| Extruder zone 1, °F | 630 | 630 | 630 | 630 | 630 |
| Extruder zone 2, °F | 635 | 635 | 635 | 635 | 635 |
| Die heaters, °F | 628 | 628 | 628 | 628 | 628 |
| Average air chamber, °F | 650 | 650 | 650 | 650 | 650 |
| Average die tip, °F | 665 | 665 | 665 | 665 | 665 |
| Screw, r.p.m | 25 | 25 | 25 | 25 | 25 |
| Die to collector dist., inches | 12 | 12 | 12 | 12 | 12 |
| Polymer rate, gm./min | 15.7 | 15.7 | 14.7 | 14.1 | 12.1 |
| Air rate, lb./min | | | | | |
| Die pressure, p.s.i. | 100 | 100 | 50 | 75 | 175 |
| Web appearance | Good | Good | Good | Good | Good |

Very good quality webs were obtained for all samples even though conditions were not changed during the run. Attempts to optimize properties were not made in this run.

Physical properties for these blends are shown in Table VI.

TABLE VI

| Run | 13-1 | 13-2 | 13-3 | 13-4 | 13-5 |
|---|---|---|---|---|---|
| Percent polypropylene | 100 | 75 | 50 | 25 | 0 |
| Percent TPX | 0 | 25 | 50 | 75 | 100 |
| Average basis wt. g./met.$^2$ | 108 | 112 | 111 | 73 | 68 |
| MD zero span tensile, meters | 2,484 | 1,707 | 1,148 | 2,718 | 2,704 |
| Strip tensile uncal., meters | 545 | 288 | 66 | 83 | 267 |
| MD tear factor, dm.$^2$ | 203 | 51 | 70 | 151 | 124 |
| CD tear factor, dm.$^2$ | 199 | 54 | 68 | 173 | 116 |

Electrical properties were also tested and found to be excellent for all blends. The mats containing fibers of a blend of polypropylene and poly-4-methylpentene-1 had improved temperature resistance as the amount of poly-4-methylpentene-1 increased. Hence, a property which is deficient if only a single thermoplastic resin is used to make a non-woven mat may be overcome according to the present invention where a blend of two or more thermoplastic resins are employed.

A blend of nylon and a polyolefin such as polypropylene yields a dyeable mat which is not possible with a polyolefin alone. Polystyrene blended with polyolefins yields a more stiffer mat. It is understood, however, that besides the thermoplastic resin as blends that other additives may also be included in the blend such as a dye pigment or the like.

The nature and object of the present invention having been completely described and illustrated and the best mode thereof contemplated set forth, what we wish to claim as new and useful and secure by Letters Patent is:

1. A nonwoven mat which comprises solely of:
  a plurality of randomly dispersed superfine discontinuous fibers which fibers have been prepared from a melt-blowing process in which two or more components, one of which is a thermoplastic fiber-forming resin, are blended together, extruded in their molten state through a row of die openings in a die head, contacted with stream of hot gas at said die head in order to attenuate the extruded resin in a direction away from the die openings to form fibers and collecting said fibers at a distance between from 1 to 30 inches from the die openings, said fibers having average diameters of from 0.5 to 5 microns, wherein each fiber comprises a blend of a major portion of said fiber-forming thermoplastic resin and at least one other component selected from the group consisting of dyes suitable for coloring said blend, non-fiber forming thermoplastic resins and combinations of the foregoing, wherein said blend comprises not more than 10 wt. percent of said dyes based on the total blend, wherein said mat is free of shot and rope and wherein said one other component is generally dissimilar in chemical properties from said fiber-forming thermoplastic resin.

2. A nonwoven mat according to claim 1 wherein the fibers have a diameter less than 10 microns.

3. A nonwoven mat according to claim 1 wherein the blend comprises two chemically different thermoplastic resins.

4. A nonwoven mat according to claim 3 wherein said blend is polypropylene and nylon.

5. A nonwoven mat according to claim 3 wherein said fiber-former thermoplastic resins are selected from the group consisting of polypropylene, polyethylene, poly-4-methylpentene-1, and polystyrene.

6. A nonwoven mat according to claim 1:
  wherein the fibers within the mat have a two directional randomness, each of said fibers being composed of a blend of at least two chemically different thermoplastic resins and having a diameter less than 10 microns.

7. A nonwoven mat according to claim 6 wherein said blends of thermoplastic resins are selected from the group consisting of polypropylene and nylon, polypropylene and polyethylene, polypropylene and poly-4-methylpentene-1, and polypropylene and polystyrene.

References Cited

UNITED STATES PATENTS

| 3,554,854 | 1/1971 | Hartmann | 161—170 |
| 3,692,867 | 9/1972 | Mayer et al. | 161—169 |
| 3,704,198 | 11/1972 | Prentice | 161—170 |

W. J. VAN BALEN, Primary Examiner

U.S. Cl. X.R.

156—181, 244; 161—170